No. 854,870. PATENTED MAY 28, 1907.
A. B. CALKINS.
MATCH MAKING MACHINERY.
APPLICATION FILED APR. 19, 1906.

WITNESSES:
INVENTOR
BY
ATTORNEYS

No. 854,870. PATENTED MAY 28, 1907.
A. B. CALKINS.
MATCH MAKING MACHINERY.
APPLICATION FILED APR. 19, 1906.

WITNESSES:
C. F. Carrington
L. S. Andruos Jr.

INVENTOR
Alvum B. Calkins
BY
Chapin Hayford Markle
his ATTORNEYS

THE NORRIS PETERS CO., WASHINGTON, D. C.

No. 854,870. PATENTED MAY 28, 1907.
A. B. CALKINS.
MATCH MAKING MACHINERY.
APPLICATION FILED APR. 19, 1906.

WITNESSES: INVENTOR
Alvin B. Calkins
BY
ATTORNEYS

No. 854,870. PATENTED MAY 28, 1907.
A. B. CALKINS.
MATCH MAKING MACHINERY.
APPLICATION FILED APR. 19, 1906.

WITNESSES:

INVENTOR

BY
ATTORNEYS

No. 854,870. PATENTED MAY 28, 1907.
A. B. CALKINS.
MATCH MAKING MACHINERY.
APPLICATION FILED APR. 19, 1906.

WITNESSES:

INVENTOR

UNITED STATES PATENT OFFICE.

ALMON B. CALKINS, OF BELLEVILLE, NEW JERSEY, ASSIGNOR TO FERRAL C. DININNY, OF NEW YORK, N. Y.

MATCH-MAKING MACHINERY.

No. 854,870.  Specification of Letters Patent.  Patented May 28, 1907.

Application filed April 19, 1906. Serial No. 312,589.

*To all whom it may concern:*

Be it known that I, ALMON B. CALKINS, a citizen of the United States of America, and a resident of Belleville, county of Essex, State of New Jersey, have invented certain new and useful Improvements in Match-Making Machinery, of which the following is a specification, reference being had to the accompanying drawings, forming a part thereof.

My invention relates to improvements in match making machinery, and particularly to means for severing sections of veneer into splints, separating the splints so severed and sticking them into carriers.

One of the most difficult problems to solve in connection with the handling of splints cut from veneer, is the individual handling of the splints whereby they may be separated one from another to any desired extent without losing at any time absolute control thereof. A second problem is that of handling the splints at a sufficient speed to make the operation commercially profitable, and the main objects of my invention are directed to the solution of these two problems.

In carrying out my invention I have devised a machine which has many features of novelty useful not only in their combinations with each other, but also in combination with elements of other machines. Such features include a novel form, construction and operation of cutting devices, novel means for forcing the splints produced by the cutting devices to individual receivers, novel means operating in combination with the receivers for retaining the splints therein, novel splints separating means, and novel means for forcing the splints from the receivers into carriers.

In order that my invention may be fully understood I will describe in detail an apparatus constituting an embodiment thereof and illustrated in the accompanying drawings, and will then point out the novel features in claims.

In the drawings I have shown only so much of a match making machine as a whole as is necessary to the complete understanding of my invention.

The frame of the machine comprises generally side frames 1, connected by transverse bolts 2. Suitably journaled in the framework are two transverse shafts 3 and 4, the shaft 3 being the driving shaft, and the shaft 4 the shaft which carries the cams for operating parts of the apparatus, and which shaft I will hereafter refer to as the cam shaft. The cam shaft has secured thereto a spur gear 5, which is in mesh with a pinion 6 upon the drive shaft 3, the said gear wheels herein having a ratio of two to one, so that the shaft 3 makes two revolutions for every one revolution of the shaft 4.

Figure 11:
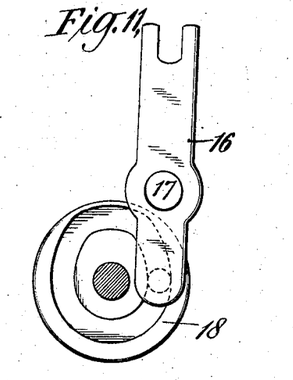
Fig. 11 is a detail view showing one of the cams for operating the carriage.

Mounted upon the top of the side frames 1 are longitudinal guideways or tracks 7. These guideways or tracks form supports for carriages 8, 8, arranged to slide longitudinally thereon. The carriages are held down to the tracks or guideways and prevented from getting out of proper relation therewith by means of retaining bars 9 engaging the said carriages, and provided with dependent legs or standards 10 which are secured fast to the framework. The carriages 8 each comprise side frames 11, a horizontal plate 12, which connects the side frames together, a cap 13 supported by the side frames 11 above the horizontal plate 12, and overhead standards 14 carried by the caps. For constructional details of these carriages reference is made more particularly to Figs. 4, 7, 8 and 9, which illustrate same on a somewhat larger scale than they are illustrated in the other views. The two carriages are designed to be moved toward and away from each other in the operation of the machine, and for this purpose are provided with trunnions 15 projecting laterally therefrom, said trunnions engaged by levers 16, fulcrumed at 17 to studs upon the side frames 1, and engaging cam grooves 18 in cam members carried by the cam shaft 4. The cams 18 are arranged in duplicate with oppositely arranged cam grooves disposed 180 degrees in advance of each other upon the shaft 4, so that the two sets of levers 16 will be simultaneously moved toward and away from each other and a like movement imparted to the carriages 8. One of these cams is shown in detail in Fig. 11, and by reference to such figure it will be seen that one half of the said cam groove is concentric, so that no movement will be imparted to the carriages during one half of the movement of the cam shaft, the same remaining at rest in their positions farthest away from each other, while a quick movement toward each other, a slight dwell at the point nearest each other, and then a quick movement away from each other, will be effected during the remaining half of the revolution of the said shaft 4. The slight dwell will of course take place during another concentric portion of the cam groove, such concentric portion being arranged diametrically opposite during the first said concentric portion and arranged at a distance farther away from the center of rotation of the cam. The portions of the cam which connect the two said concentric portions compel the movements of the carriages in opposite directions, as will be well understood.

Figure 2:
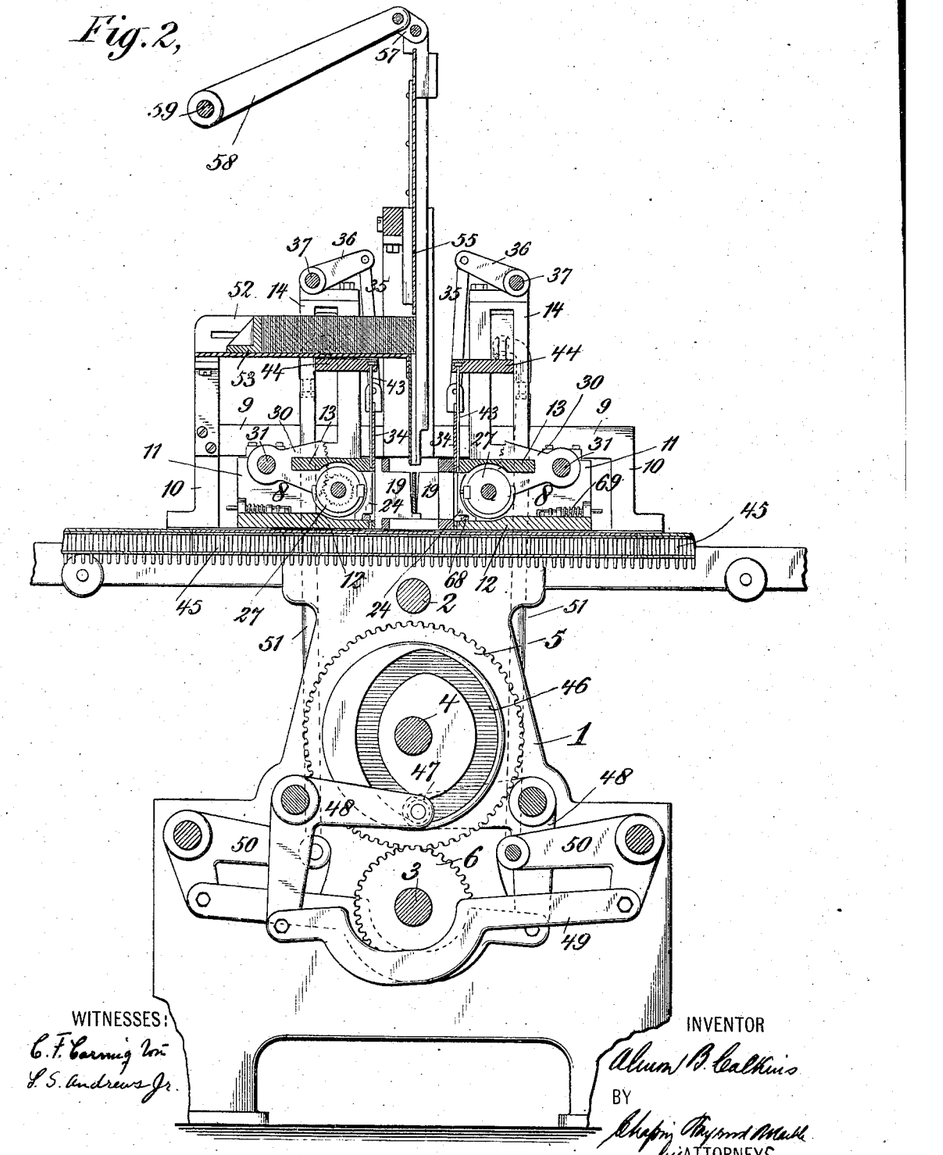
Fig. 2 is a view in central vertical longitudinal section of same.
Figure 3:
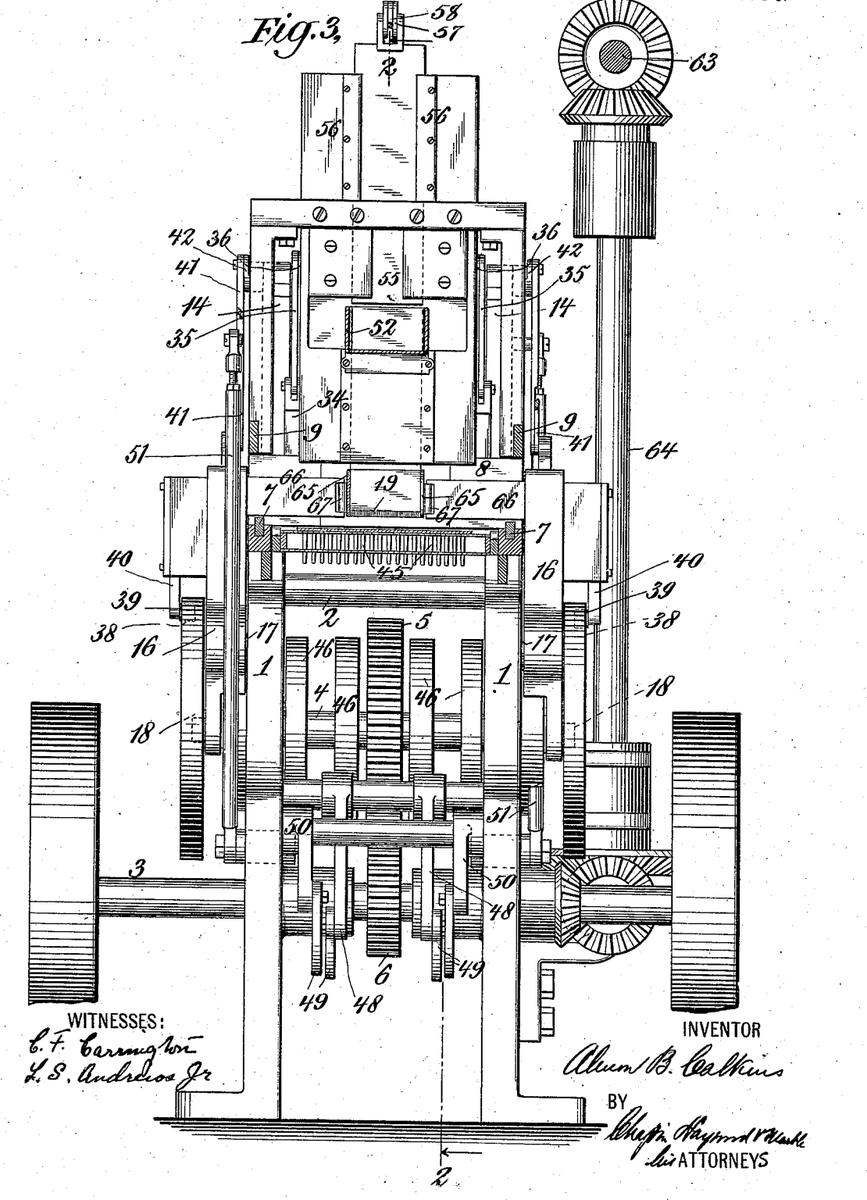
Fig. 3 is a transverse sectional view substantially upon the plane of the broken line 3—3 of Fig. 1.
Figures 4, 5, 6:
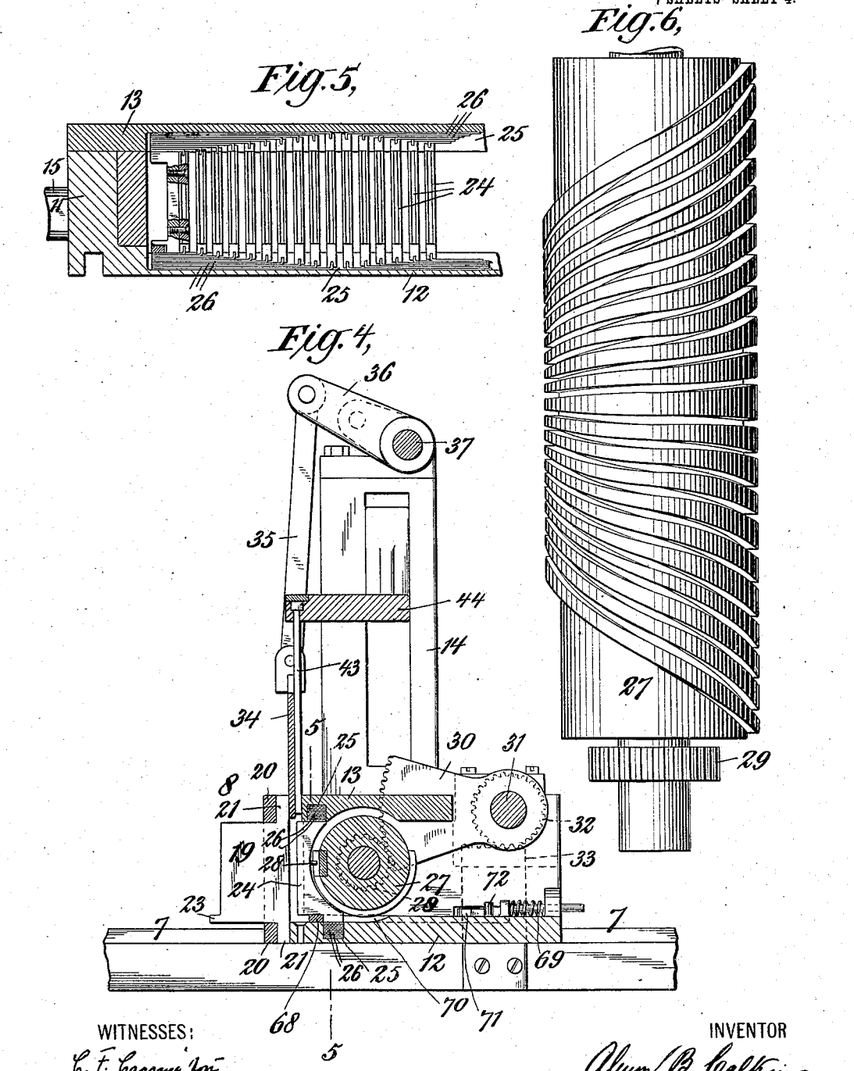
Fig. 4 is an enlarged detail view in longitudinal section through one of the carriages and parts carried thereby.
Fig. 5 is a detail view in transverse vertical section, substantially upon the line 5—5 of Fig. 4, showing particularly the splint carriers and their housing.
Fig. 6 is a detail view of one of the separator cams employed.
Figure 7:
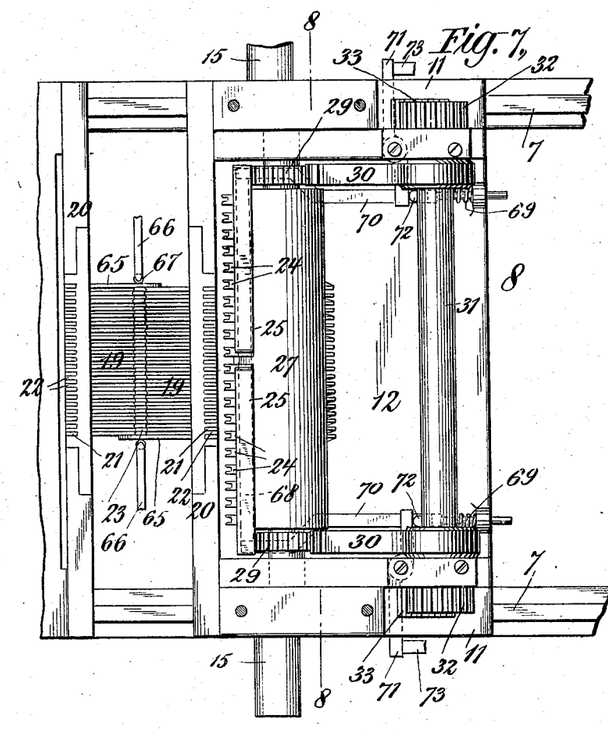
Fig. 7 is a top view of parts of the carriage, the upper portion thereof being removed.
Figure 8:
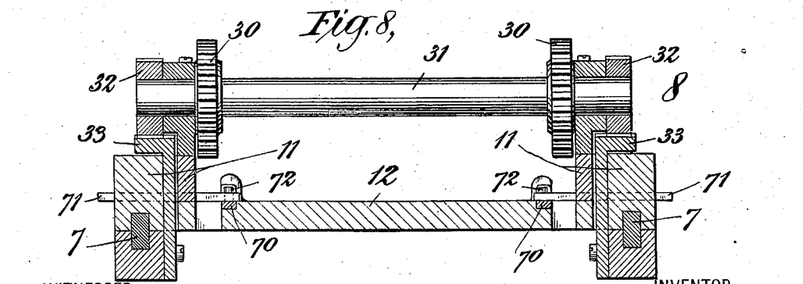
Fig. 8 is a transverse sectional view of the parts shown in Fig. 7, the plane of section being taken upon the line 8—8 of Fig. 7.
Figure 9:
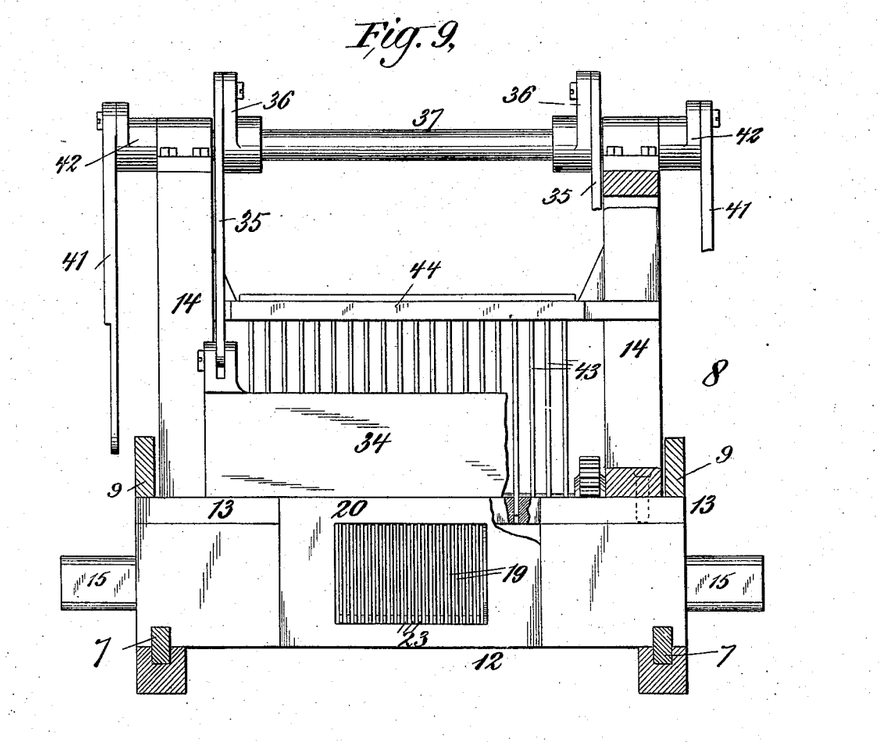
Fig. 9 is a front view of one of the carriages with certain parts broken away.
Figure 10:
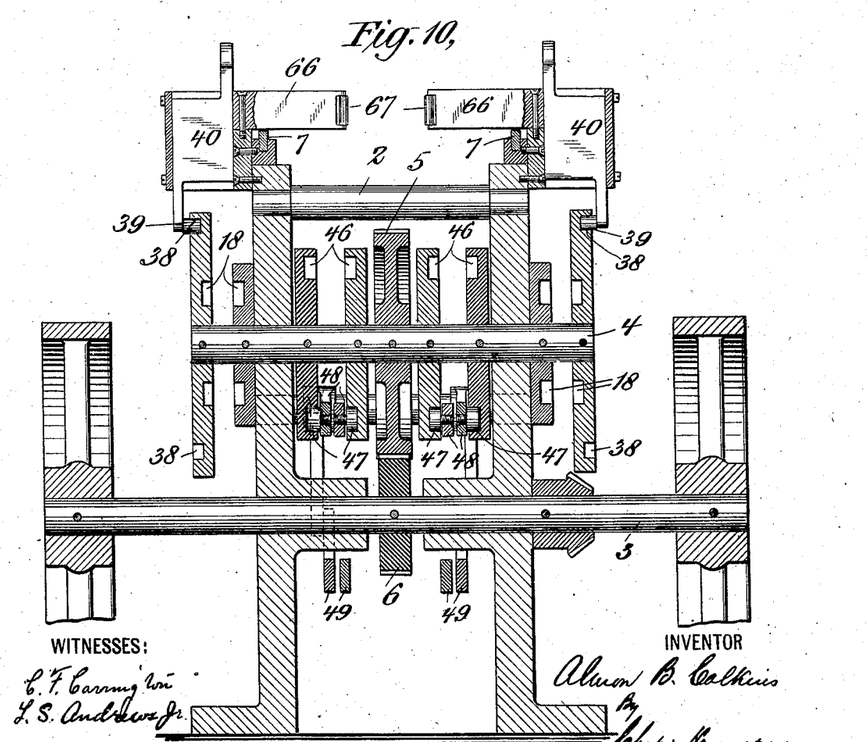
Fig. 10 is a view in transverse section of the operating mechanism and certain connected parts, the plane of section being substantially upon the line 10—10 of Fig. 1.

Each of the carriages 8, as a whole, carries a set of cutters arranged for co-operation with the set of cutters carried by the other said carriage, a plurality of individual splint receivers, and a rotary cam for separating these splints receivers and for bringing them together again. The cutters in general construction and principle of operation are similar to the cutters shown in my former patent No. 791,004, of May 30th, 1905, though in details of construction and in specific features of operation they differ, as will be presently pointed out. Each set of cutters comprises a plurality of relatively stationary individual blades 19 (one of such blades showing clearly in side elevation in Fig. 4), said blades arranged in a housing 20, secured to, or constructed as a part of the carriage 8. The blades are supported by upwardly and downwardly projecting lugs 21, spacing pieces 22 being employed to space the said blades apart so that the blades of one carriage will alternate with the blades of the opposite carriage, whereby, in the reciprocation of the carriages, the blades of one carriage may be received between the blades of the other carriage, as will readily be understood by reference to Fig. 7 of the drawings. The spacing pieces extend only between the lugs 21, leaving the entire space between the main portions of the blades free and unobstructed. The cutting face of these blades is preferably slightly out of a vertical line, so that opposite cutters will present substantially shearing edges to each other, as is shown in Fig. 2. At the lower end of the cutting edges is a projecting lip 23 arranged to support material when it is presented for cutting, whereby material will be prevented from falling past the cutters before it is acted upon thereby. At the rear of the cutter blades in each carriage there is arranged a plurality of individual splint receivers 24, each splint receiver arranged with jaws substantially ⊐-shaped in cross section, constructed to receive a single splint as it is presented laterally thereto, and to support the same individually without necessary co-operation with any other receiver. These receivers, when in close order, are arranged one each between each pair of blades in their respective carriages, but the said receivers are arranged to have a lateral movement in the plane in which they lie, at the rear of the said cutter blades, so that they may be separated into open order when desired, as shown in Figs. 5 and 7 of the drawings. The said receivers project above and below into slideways 25 in the carriage plate 12 and cap 13, said carriers being further provided preferably with overlapping tongues 26, which, fitting snugly within the said grooves and between each other, tend to properly guide the said receivers in their movements and to prevent them from getting out of their proper parallel relationship. At the rear of the said receivers 24 is arranged a separator cam 27, said separator cam suitably journaled in bearings carried by, or formed as a part of, the carriage 8. This cam 27 has a number of variously arranged cam grooves forming substantially oppositely arranged spirals of progressively increasing pitch. The receivers 24 have cam followers 28, which are received in the grooves of said cam 27, whereby rotation of the said cam will effect the separation or bringing together of the said receivers, in accordance with the relationship of the parts. In the example shown in the drawings one half of a revolution of the cam 28 is sufficient to completely separate or bring together the receivers, and means is provided for imparting such one half revolution to the cam first in one direction and then in the other for effecting such result. Preferably, there will be a slight dwell toward the end of the movement of the cam after the receivers have been brought entirely together, so that, during the final movement of the carriages toward each other, the receivers will be held relatively stationary. To effect the rotary reciprocating movement of the cam 27, the said cam is provided with pinions 29 at opposite ends thereof, said pinions in mesh with sectors 30 carried by a transverse shaft 31 suitably journaled in the carriage side frames 11. The shaft 31 also carries pinions 32, which mesh with the teeth of stationary racks 33 secured to the main side frames 1 of the machine. From the foregoing it will be understood that a movement of the carriage in one direction or the other will effect rotary reciprocating movements of the cam 27. The racks 33 being stationary, a forward movement of the carriage will effect a rotary movement of the shaft 31 in a direction to depress the sector 30, and give a movement to the cam 27 such as will effect the separation of the receivers. During the return movement of the carriage, the sector 30 will be lifted to again return the cam to its normal position, in which position it is shown in the drawings.

Arranged in a plane immediately in advance of the receivers, and between the open mouths of the receivers and the rear edges of the cutter blades 19, and of a width greater than the width of all the receivers when they are in their extreme separated positions, is a guard plate 34, the said guard plate arranged normally with its lower edge in a position above the receiving portion of the receivers, provision being made, however, for the said blade to be lowered down to a position completely covering the said receivers, entirely closing the mouths thereof. This plate 34 is connected by means of links 35 with arms 36 upon a rock shaft 37 carried by the carriage standards 14. The rock shaft is operated by means of cams 38, said cams engaging cam followers 39 mounted upon slides 40, the slides connected by links 41 with operating arms 42 upon the rock shaft 37. Rotation of the cams 38 will, at the proper time, lower the guard plate 34 into its lowermost position in front of the receivers 24, so as to effectually retain within the receivers any splints which have been deposited therein, and to again lift the plate after the splints have been removed from the receivers, as will be now described.

The ejecting means for each set of receivers comprises a plurality of plunger rods 43, carried by a cross head 44, which is mounted to slide in suitable guideways in the overhead standards 14 of the carriages. These plungers pass through suitable perforations in the caps 13, and register with the receivers when they are in their open or separated position. The plungers are normally held in their uppermost positions clear of the receivers, but are arranged to be lowered at the proper moment to force the splints from the receivers down into carriers 45 arranged to travel beneath them. The reciprocation of the cross heads is brought about by means of cams 46 secured upon the cam shaft 4, and arranged between the main side frames 1 of the machine. The cams engage followers 47, carried by bell crank levers 48, said bell crank levers connected by means of links 49 with other bell crank levers 50, in turn connected by means of links 51 with the cross heads 44. The cams 46 are concentric through one half of their revolution, and impart reciprocating movements to the plungers during the other half. They are so arranged with relation to the carriage operating cams that while the carriages are moving, the said plungers will be held stationary, reciprocating movement being imparted to the said plungers during the times the carriages are held stationary and in their outermost position.

Any suitable feed for conveying veneer cards to a position to be operated upon by the cutters may be employed. In the present example of my invention, I have shown a simple means comprising a trough 52, in which a number of veneer cards are carried, said trough provided with a follower 53, acted upon by a weight 54 to force the veneer cards forward as they are fed one at a time by means of the feed plate. The feed plate comprises a blade 55, guided in suitable ways 56 and connected by means of a link 57 with an operating arm 58. The operating arm 58 is suitably pivoted at 59 to some part stationary with the machine, and forms one arm of a bell crank lever, the other arm 60 of which carries a cam follower 61 engaged by a cam 62 upon the overhead shaft 63. The cam 62 is arranged to give a quick movement of reciprocation to the feed plate 55, first lifting the same high enough to clear the veneer cards in the trough 52, and then lowering the same sufficiently to carry the foremost veneer card down to a position between the cutters. The cam 62 is arranged to be properly timed with respect to the carriage operating cams so as to cause the veneer card to be fed down while the carriages are their full distance apart and the cutter blades thereby separated, as clearly shown in Fig. 2 of the drawings. The shaft 63 is shown herein as driven from the main driving shaft 3 by means of suitable intermediate bevel gearing and a vertical shaft 64. The ratio of the intermediate gearing is here shown as one to two, so that the speed of rotation of the shaft 63 will correspond with the speed of rotation of the cam shaft 4. The width of a veneer card is arranged to correspond as near as possible with the exact distance between the outermost cutter blades, and, in order to properly confine the veneer card to its position between the cutter blades, I have provided end plates 65 arranged to engage the outer faces of the outermost cutter blade, as will be readily understood by reference to Fig. 7 of the drawings. For the purpose of preventing these plates from separating, I have provided side guides 66 therefor, rigidly secured to some part stationary with the machine, said guides preferably provided with anti-friction rollers 67 as the parts which actually engage the said plates.

Figure 1:
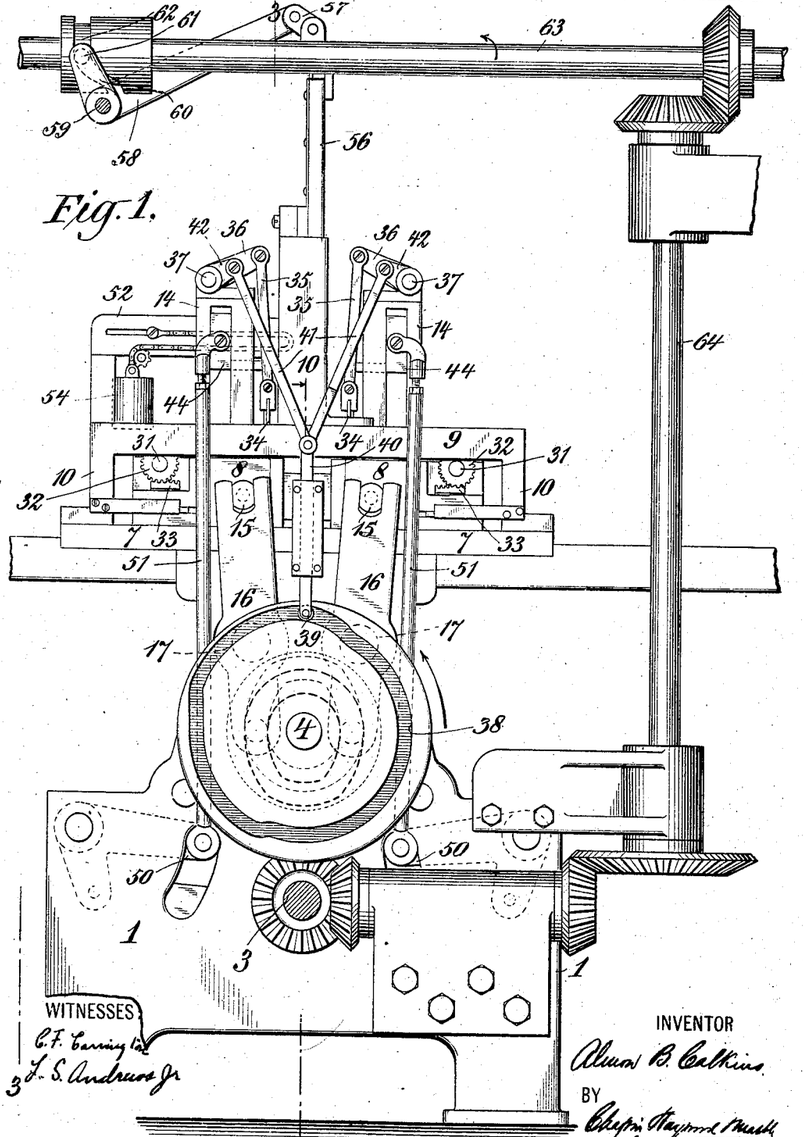
Figure 1 is a view in side elevation of a mechanism embodying my invention.

A complete cycle of the apparatus is as follows: In the position in which the parts are shown in the drawings, the carriages 8, 8 are all the way back, having just completed a rearward movement, the cams 18 therefor being at a point just preceding the half revolution during which the carriages remain at rest. The carriages being all the way back, the separator cams will have been turned to a position in which the receivers are fully separated, and the said receivers in the ordinary operation of the machine will have received, and be holding, splints from a previous cutting operation. The feed cam 62 is in a position just at the termination of the rest portion of the cam, with the feed slide all the way up and ready to be moved down to engage another veneer card. The plungers are all the way up, and the plunger cams have just arrived at the termination of their rest portions, so that, during the next movement of the machine, the plungers will be depressed. The guard plates 34 are all the way up, the cams 38 therefor being at the termination of a rest portion and ready at the next movement of the machine to move the guard plates downward. During the next quarter of a revolution of the cam shaft 4 in the direction of the arrow in Fig. 1, the following movements will take place: First, depressions of the cams 38 will rapidly move the guard plates 34 all the way down in front of the receivers so as to close the mouths thereof, such movement being completed in about one sixteenth of the entire revolution of the cams 38 or one quarter of the quarter revolution now being considered. During the remaining three sixteenths of the complete revolution of the cam 38, the guard plates 34 will be held downward without movement, the cams 38 being concentric for this period and hence imparting no movement. At the moment the guard plates 34 commence to move down, the plungers 43 will also commence to move down under control of the plunger cams 46, but the plungers will move downward more slowly, their complete downward movement taking up a complete quarter of the revolution of the cam shaft 4. Splints contained within the receivers from a previous operation of the machine will be forced by the plungers down through the bottom plates 12 of the carriages 8 into the carriers 45 arranged to receive them. The carriers 45 are given a step by step forward movement by any suitable means in a manner well known, so as to be ready at each operation of the machine to receive a new charge of splints. While the two foregoing cam movements have been taking place, the carriage operating cams 18 have moved through a quarter of a revolution, but, being on their concentric or rest portions, no movements will have been imparted to the carriages. A corresponding movement, however, having been imparted to the shaft 63, the feed cam 62 will have moved through a quarter of a revolution, and will have forced the feed plate from its uppermost position all the way down to its lowermost position. The effect of this will be to force a fresh veneer card from the trough 52 down to a position between the cutter blades ready for a cutting operation. During the next quarter of a revolution, the plunger cams 46 will return the plungers to their uppermost positions, the guard plate cams 38 will move through rest portions, so that the guard plates will remain stationary, the carriage cams 18 will pass through the remaining one quarter rest portions, and the feed cam 62 will operate to return the feed plate 55 to its uppermost position above the veneer cards in the trough 52.

During the third quarter of a revolution the plunger cams 46 turn through rest portions, so that no movements are imparted to the plungers, and the same is true of the feed cam 62. The guard plate cams 38, however, move for a short distance through a rest portion, and then quickly raise the guard plate from in front of the splint receivers, the receivers no longer needing such guard because the splints have already been discharged therefrom and they are now empty, ready for a new charge. During the remainder of this quarter of a revolution the cam 38 travels through a rest portion. At the commencement of this third quarter of the cycle the carriages will be quickly brought together by operation of the carriage cams 18, the latter portion of this quarter of a revolution representing a rest period for the carriages after they have been entirely brought together, corresponding to the short concentric portion of the carriage operating cams 18 in this quarter of their movements. In moving forward, the separator cams 27, carried by the carriages, will be rotated so as to bring the receivers together, and, as above explained, the receivers will be completely drawn together just prior to the completion of the forward movements of the carriage, owing to there being a slight dwell in the operating grooves of the cam 27. One of the first effects, however, of moving the carriages forward is to cause the cutter blades 19 of opposite carriages to coact, so as to separate the veneer card between them into a plurality of splints, alternate splints being received between the pairs of cutter blades of opposite carriages. Further movement of these carriages toward each other forces the splints onward, until, finally, they are forced beyond the cutter blades between which they travel, and into the open mouths of the receivers at the rear thereof which are now in the proper positions to receive them. The cutter blades of opposite carriages force the splints into the receivers of the other carriages with sufficient pressure to cause them to be retained firmly therein.

It may be here noted that, because of the peculiar relation of the links and parts connecting the guard plates with their operating cams, and of the fact that the guard plates move with the carriages, a movement of the carriages toward each other effects a slight raising movement of the guard plates 34, irrespective of the movements imparted thereto by their cams 38. For this reason the cams 38 did not operate to raise the cam followers quite to their highest point during the last mentioned quarter of the revolution of the cam shaft 4, the movement of the carriages imparting the additional movement required. On the next and last quarter of the cycle of revolution, the carriages move apart, however, and hence a tendency is given to thereby move the guard plates downward for a short distance. To overcome this, the cams 38 are given a slight rise during the next quarter of the cycle of movement, this amount of rise being just sufficient to counteract the tendency of the plates to be moved downward, so that, although the cams 38 show a rise as well as a concentric portion for the next quarter of a cycle, the same represents substantially a rest position for the guard plates during the whole of the period. During this time the plunger and feed cams also pass through rest periods, so that no movements are imparted to the plungers or the feed plate. The carriage cams 18, however, pass through a short rest period, and then quickly move the carriages back again to their extreme outer positions. During such movements the separator cams will be rotated by reason of their gear connections with the stationary racks through the sectors 30, and the receivers, carrying each a splint, will be separated, so that they will be ready at the end of this portion of the cycle of the operation to be discharged into the carriers. The parts are now back in the positions they started from, and a complete cycle of the machine has been effected.

In order to relieve the jar upon the machinery which might be caused by the splints partially leaving the channels between the cutter blades prior to their being received within the splints receivers, an intermediate space being left as a path for the movement of the guard plates 34, I have provided a buffer bar 68 in the path of the said blades, said buffer bar being arranged to be engaged by the forwardly projecting lips 23 of the cutter blades of opposite carriages, as the carriages come together. The buffer bar 68 is spring resisted by means of springs 69, which engage arms 70 carried by the said bar. This spring buffer bar operates upon the cutters for a short space of time just prior to the final movement of the carriages. Upon the final movement of the carriages the spring tension is taken off of the said bar by means of rocking levers 71, which engage pins or abutments 72 on the arm 70, and are engaged by stationary abutments 73 secured to the main side frames 1 of the machine (see particularly Fig. 7). Thus it will be seen that the buffer bars will first perform their function to prevent shock at the moment the splints are relieved from the cutter blades, and will be themselves relieved of pressure at the final movement of the parts as the splints are forced into the receivers.

It will be obvious that the foregoing is but one embodiment of my invention and that the same is capable of many and varied modifications within the spirit and scope of my invention, and, further, that certain parts may be employed in connection with other parts of different construction, hence I do not desire to be limited only to the precise details of construction and combination of parts herein.

What I claim is:

1. In match making machinery, the combination of cutters comprising two sets of alternately arranged cutting blades, means for reciprocating the blades in paths between and past each other, individual splint receivers for receiving splints sidewise from the cutting blades, and means for separating the receivers.

2. In match making machinery, the combination of cutters comprising two sets of alternately arranged cutting blades, means for reciprocating the blades in paths between and past each other, individual splint receivers for receiving splints sidewise from the cutting blades, and means for laterally separating the receivers.

3. In match making machinery, the combination of cutters comprising two sets of alternately arranged cutting blades, means for reciprocating the blades in paths between and past each other, independent individual splint receivers arranged in line with the cutters, adapted to receive splints sidewise and directly from the cutters, and means for separating the receivers.

4. In match making machinery, the combination of cutters comprising two sets of alternately arranged cutting blades, means for reciprocating the blades in paths between and past each other, independent individual splint receivers arranged in line with the cutters, adapted to receive splints sidewise and directly from the cutters, and means for laterally separating the receivers.

5. In match making machinery, the combination with separable individual splint receivers, of cutting means for separating veneer strips into splints, means for reciprocating the cutting means a distance sufficient to first perform the cutting operation and subsequently to force the splints thus produced sidewise into the receivers; and means for separating the receivers.

6. In match making machinery, the combination with separable individual splint receivers, of cutting means for separating veneer strips into splints, means for reciprocating the cutting means a distance sufficient to first perform the cutting operation and subsequently to force the splints thus produced sidewise into the receivers, and means for laterally separating the receivers.

7. In match making machinery, the combination with two carriages reciprocatory toward and away from each other, two sets of alternately arranged cutter blades carried by said carriages, separable individual splint receivers supported upon said carriages, and means for reciprocating the carriages and for individually separating the receivers.

8. In match making machinery, the combination with cutters comprising two sets of alternately arranged cutting blades, means for reciprocating the blades in paths between and past each other, separable individual receivers for receiving splints from the cutting blades, said receivers reciprocating with the cutter blades, and means for separating the receivers laterally of their paths of reciprocation.

9. In match making machinery, the combination with two carriages reciprocatory toward and away from each other, two sets of alternately arranged cutter blades carried by said carriages, separable individual splint receivers supported upon said carriages, means for reciprocating the carriages, and means operated by the reciprocating movement of the carriages to individually separate the receivers.

10. In match making machinery, the combination with two carriages reciprocatory toward and away from each other, two sets of alternately arranged cutter blades carried by said carriages, separable individual splint receivers supported upon said carriages, means for reciprocating the carriages, and means operated by the reciprocating movement of the carriages to separate the individual receivers laterally.

11. In match making machinery, the combination with two carriages reciprocatory toward and away from each other, two sets of alternately arranged cutter blades carried by said carriages, separable individual splint receivers supported upon said carriages, means for reciprocating the carriages, and a cam for separating the individual receivers.

12. In match making machinery, the combination with two carriages reciprocatory toward and away from each other, two sets of alternately arranged cutter blades carried by said carriages, separable individual splint receivers supported upon said carriages, means for reciprocating the carriages, a separator cam for the receivers upon each of the carriages, and means for rotating the said cam.

13. In match making machinery, the combination with two carriages reciprocatory toward and away from each other, two sets of alternately arranged cutter blades carried by said carriages, separable individual splint receivers supported upon said carriages, means for reciprocating the carriages, a separator cam for the receivers upon each of the carriages, and means for rotating the said cam by the reciprocation of the said carriages.

14. In match making machinery, the combination with two carriages reciprocatory toward and away from each other, two sets of alternately arranged cutter blades carried by said carriages, separable individual splint receivers supported upon said carriages, means for reciprocating the carriages, a separator cam for the receivers upon each of the carriages, and stationary rack means for rotating the cams upon the reciprocation of the carriages.

15. In match making machinery, the combination of cutters comprising two sets of alternately arranged cutting blades, cams for reciprocating the blades in paths between and past each other, said cams having dwell portions therein, independent individual splint receivers for receiving splints from the cutting blades, means for laterally separating the receivers, and means for feeding material between the cutter blades while the dwell portions of the cams are active.

16. In match making machinery, the combination with two carriages reciprocatory toward and away from each other, two sets of alternately arranged cutter blades carried by said carriages, separable individual splint receivers supported upon said carriages, cams for reciprocating the carriages, said cams having dwell portions, means for feeding material between the cutter blades during the time the dwell portions of the said cams are active, and means for individually separating the receivers during the time the carriages are moving.

17. In match making machinery, the combination with two carriages reciprocatory toward and away from each other, two sets of alternately arranged cutter blades carried by said carriages, separable individual splint recceivers supported upon said carriages, cams upon the carriages for engaging the splints receivers and laterally separating them, gear sectors engaging the cams, stationary racks operating the gear sectors, and means for reciprocating the carriages.

18. In match making machinery, the combination with two sets of individual splint receivers, and reciprocatory means for forcing alternate individual splints from a neutral plane in opposite directions into the receivers, of means for separating the receivers after they have received the splints.

19. In match making machinery, the combination with two sets of individual splint receivers, and reciprocatory means for forcing alternate individual splints from a neutral plane in opposite directions into the receivers, of means for separating the receivers in directions transverse to the plane of movements of the said reciprocatory means.

20. In match making machinery, the combination with reciprocatory means for forcing alternate individual splints from a neutral plane in opposite directions into receivers, of two sets of receivers carried by the oppositely moving reciprocatory elements, and means for separating the individual receivers of each set.

21. In match making machinery, the combination with separable individual splint receivers for receiving individual splints sidewise, and means for separating the receivers, of a guard plate arranged to co-operate with the receivers to prevent accidental sidewise displacement of the splints.

22. In match making machinery, the combination with separable individual splint receivers substantially ⊐-shaped in cross section, whereby they may receive splints presented laterally thereto through their open sides, of a guard plate arranged in its movement to close the open sides of said receivers, means for operating the guard plate, and means for separating the receivers.

23. In match making machinery, the combination with a plurality of separable individual splint receivers substantially ⊐-shaped in cross section, whereby they may receive splints presented laterally thereto through their open sides, said receivers arranged in a row with their open sides in a plane, of a guard plate arranged to move in a path adjacent said plane to form closures for the said splint receivers, means for reciprocating the guard plate, and means for separating the receivers in their row after the guard plate has been moved to a position closing their open sides.

24. In match making machinery, the combination with a plurality of separable individual splint receivers substantially ⊐-shaped in cross section, whereby they may receive splints presented laterally thereto through their open sides, said receivers arranged in a row with their open sides in a plane, of a guard plate arranged to move in a path adjacent said plane to form closures for the said splints receivers, means for reciprocating the guard plate, and cam means for separating the receivers in their row after the guard plate has been moved to a position closing their open sides.

25. In match making machinery, the combination with a plurality of separable individual splint receivers substantially ⊐-shaped in cross section, whereby they may receive splints presented laterally thereto through their open sides, said receivers arranged in a row with their open sides in a plane, of a guard plate arranged to move in a path adjacent said plane to form closures for the said splint receivers, means for reciprocating the guard plate, and a rotary cam for separating the receivers in their row after the guard plate has been moved to a position closing their open sides.

26. In match making machinery, the combination with a reciprocating carriage, of a plurality of separable individual splint receivers carried thereby, said splint receivers having open sides whereby they may receive splints presented laterally to them, a guard plate, means for reciprocating the carriage and for simultaneously separating the receivers, and means for moving the guard plate to a position wherein it will close the open sides of the receivers during their separating movements.

27. In match making machinery, the combination with a reciprocating carriage, a plurality of separable individual splint receivers carried thereby, said receivers being open sided, whereby they may receive splints laterally presented to them, and a guard plate also carried by said carriage for closing the open sides of the receivers, of a separator cam upon said carriage engaging said receivers, means for reciprocating the carriage, stationary means engaging the separator cam thereon for operating same during the reciprocating movements of the carriage, and means for operating the guard plate.

28. In match making machinery, the combination of cutters comprising two sets of alternately arranged cutting blades, means for reciprocating the blades in paths between and past each other, separable individual splint receivers for receiving splints from the cutting blades, reciprocating guard or retaining plates co-operating with the receivers after the splints have been received thereby, and means for separating the receivers.

29. In match making machinery, the combination of cutters comprising two sets of alternately arranged cutting blades, means for reciprocating the blades in paths between and past each other, separable individual splint receivers arranged in line with the cutters, adapted to receive splints sidewise and directly from the cutters, guard plates, means for interposing the same between the cutters and the receivers, and means for separating the receivers.

30. In match making machinery, the combination with separable individual receivers, of cutting means for separating veneer strips into splints, means for reciprocating the cutting means a distance sufficient to first perform the cutting operation and subsequently to force the splints thus produced sidewise into the receivers, guard plates, means for moving the guard plates to a position in front of the receivers after the splints have been received therein, and means for separating the receivers.

31. In match making machinery, the combination with two carriages reciprocatory toward and away from each other, two sets of alternately arranged cutter blades carried by said carriages, separable individual splint receivers supported upon said carriages, guard plates, means for moving the guard plates to a position in front of the splint receivers, and means for reciprocating the carriages and for individually separating the receivers.

32. In match making machinery, the combination with two sets of individual splint receivers and reciprocatory means for forcing alternate individual splints from a neutral plane in opposite directions into the receivers, of guard plates, means for reciprocating same in front of the receivers across the path of movement of the said reciprocatory means, and means for separating the receivers after they have received the splints.

33. In match making machinery, the combination with separable individual splint receivers for receiving individual splints sidewise, and a guard plate arranged to co-operate therewith to prevent accidental sidewise displacement of the splints, of means for separating the receivers, and plungers for ejecting splints from the receivers after they have been so separated.

34. In match making machinery, the combination with separable individual splint receivers substantially ⊓-shaped in cross section, whereby they may receive splints presented laterally thereto through their open sides, of a guard plate arranged in its movement to close the open sides of the said receivers, means for operating the guard plate, means for separating the receivers, and plungers for ejecting the splints endwise from the receivers.

35. In match making machinery, the combination with a plurality of separable individual splint receivers substantially ⊓-shaped in cross section, whereby they may receive splints presented laterally thereto through their open sides, said receivers arranged in a row with their open sides in a plane, of a guard plate arranged to move in a path adjacent to said plane to form closures for the said splint receivers, means for reciprocating the guard plate, means for separating the receivers in their row after the guard plate has been moved to a position closing their open sides, and plungers for ejecting the splints endwise from the receivers.

36. In match making machinery, the combination of cutters comprising two sets of alternately arranged cutting blades, means for reciprocating the blades in paths between and past each other, separable individual receivers arranged in line with the cutters, adapted to receive splints sidewise and directly from the cutters, means for separating the receivers, and plungers for ejecting the splints endwise from the receivers after they have been separated.

37. In match making machinery, the combination with separable individual receivers, of cutting means for separating veneer strips into splints, means for reciprocating the cutting means a distance sufficient to first perform the cutting operation and subsequently to force the splints thus produced sidewise into the receivers, means for separating the receivers, and plungers for ejecting the splints endwise from the receivers after they have been separated.

38. In match making machinery, the combination of cutters comprising two sets of alternately arranged cutting blades, means for reciprocating the blades in paths between and past each other, separable individual receivers for receiving splints from the cutting blades, reciprocating guard or retaining plates co-operating with the receivers after the splints have been received thereby, means for separating the receivers, and plungers for ejecting the splints endwise from the receivers after they have been separated.

39. In match making machinery, the combination of cutters comprising two sets of alternately arranged cutting blades, means for reciprocating the blades in paths between and past each other, separable individual receivers arranged in line with the cutters, adapted to receive splints sidewise and directly from the cutters, guard plates, means for interposing same between the cutters and the receivers, means for separating the receivers, and plungers for ejecting the splints endwise from the receivers after they have been separated.

40. In match making machinery, the combination with separable individual receivers, of cutting means for separating veneer strips into splints, means for reciprocating the cutting means a distance sufficient to first perform the cutting operation and subsequently to force the splints thus produced sidewise into the receivers, guard plates, means for moving the guard plates to a position in front of the receivers after the splints have been received therein, means for separating the receivers, and plungers for ejecting the splints endwise from the receivers after they have been separated.

41. In match making machinery, the combination with two carriages reciprocatory toward and away from each other, two sets of alternately arranged cutter blades carried by said carriages, separable individual splint receivers supported upon said carriages, means for reciprocating the carriages and for individually separating the receivers, and plungers for ejecting the splints endwise from the receivers.

42. In match making machinery, the combination with two carriages reciprocatory toward and away from each other, two sets of alternately arranged cutter blades carried by said carriages, separable individual splint receivers supported upon said carriages, means for reciprocating the carriages and for individually separating the receivers, and plungers carried by said carriages for ejecting the splints endwise from the receivers after they have been separated.

43. In match making machinery, the combination with two carriages reciprocatory toward and away from each other, two sets of alternately arranged cutter blades carried by said carriages, separable individual splint receivers supported upon said carriages, guard plates, means for moving the guard plates to a position in front of the splint receivers, means for reciprocating the carriages and for individually separating the receivers, and plungers for ejecting the splints endwise from the receivers after they have been separated.

44. In match making machinery, the combination with two sets of individual splint receivers and reciprocatory means for forcing alternate individual splints from a neutral plane in opposite directions sidewise into the receivers, of means for separating the receivers after they have received the splints, and plungers for ejecting the splints endwise from the receivers after they have been separated.

45. In match making machinery, the combination with two sets of individual splint receivers, and reciprocatory means for forcing alternate individual splints from a neutral plane in opposite directions into the receivers, of guard plates, means for reciprocating same in front of the receivers across the path of movement of the said reciprocatory means, means for separating the receivers after they have received the splints, and plungers for ejecting the splints endwise from the receivers after they have been separated.

46. In match making machinery, the combination with a reciprocating carriage, of separable individual receivers carried thereby, means for presenting splints sidewise to the receivers, and plungers carried by the carriages for ejecting the splints endwise from the receivers.

47. In match making machinery, the combination with separable splint receivers, means for bodily moving the receivers in one direction, means for imparting a separating movement to the splint receivers in a direction transverse to their bodily movement, and plungers for ejecting the splints endwise from the receivers, said plungers arranged to partake of the bodily movement of the splint receivers.

48. In match making machinery, the combination with a reciprocating carriage, of separable individual receivers carried thereby, means for presenting splints sidewise to the receivers, a guard or retaining plate arranged to move to a position adjacent the receivers, and plungers carried by the carriages for ejecting splints endwise from the receivers.

49. Splint cutting means comprising two sets of alternately arranged cutting blades, the blades of each set having portions constantly interlocked with portions of the blades of the opposite set, and means for reciprocating the cutter blades with respect to each other.

50. Splint cutting means comprising two sets of alternately arranged cutter blades, said cutter blades arranged with portions at the lower part thereof projecting beyond the cutting faces and constantly interlocked the one set with the other, and means for reciprocating the cutting faces of the blades toward and away from each other.

In witness whereof, I have hereunto set my hand.

ALMON B. CALKINS.

Witnesses:
P. W. KIEVIT,
A. G. CALKINS.